(12) United States Patent
Sylvester

(10) Patent No.: US 11,704,704 B2
(45) Date of Patent: Jul. 18, 2023

(54) SYSTEM AND METHOD FOR PROCESSING REAL-TIME ONLINE DONATIONS

(71) Applicant: Early Warning Services, LLC, Scottsdale, AZ (US)

(72) Inventor: Joseph Sean Sylvester, Scottsdale, AZ (US)

(73) Assignee: EARLY WARNING SERVICES, LLC, Scottsdsale, AZ (US)

( * ) Notice: Subject to any disclaimer, the term of this patent is extended or adjusted under 35 U.S.C. 154(b) by 257 days.

(21) Appl. No.: 17/099,500

(22) Filed: Nov. 16, 2020

(65) Prior Publication Data

US 2022/0156803 A1 May 19, 2022

(51) Int. Cl.
*G06Q 30/0279* (2023.01)
*G06Q 20/40* (2012.01)
*G06Q 40/10* (2023.01)
*G06Q 30/018* (2023.01)

(52) U.S. Cl.
CPC ..... *G06Q 30/0279* (2013.01); *G06Q 20/4016* (2013.01); *G06Q 30/018* (2013.01); *G06Q 40/10* (2013.01)

(58) Field of Classification Search
None
See application file for complete search history.

(56) References Cited

U.S. PATENT DOCUMENTS

| 2009/0192873 | A1* | 7/2009 | Marble | G06Q 20/10 705/14.1 |
| 2016/0343043 | A1* | 11/2016 | Hicks | G06Q 50/01 |
| 2021/0224869 | A1* | 7/2021 | Sharma | G06Q 20/326 |

* cited by examiner

*Primary Examiner* — Jan P Mincarelli
(74) *Attorney, Agent, or Firm* — Bryan Cave Leighton Paisner LLP

(57) ABSTRACT

A method including a system receiving, in real-time and through a computer network, a donation authorization from a donor via a donor user interface executed on a donor device of the donor. The donation authorization can comprise: a donation amount, a donor token for the donor, a donee first token for a donee, and/or donee information. The donor token can be uniquely associated with a donor account for the donor, and the donor account can be maintained by a sender financial institution. The donee first token can be uniquely associated with a donee account for the donee, and the donee account can be maintained by a receiver financial institution. The method further can include the system, after receiving the donation authorization, instructing or facilitating, in real-time and through the computer network, the receiver financial institution to post in real-time the donation amount to the donee account. Other embodiments are disclosed.

20 Claims, 7 Drawing Sheets

SYSTEM AND METHOD FOR PROCESSING REAL-TIME ONLINE DONATIONS

TECHNICAL FIELD

The technical field relates to systems and methods for transferring funds over an electronic money transfer network, and more particularly to systems and methods for processing donations made by a donor via a computer network to a donee so that the fund is available to the donee in real-time.

BACKGROUND

Many charities nowadays accept online donations on their websites because electronic payments have become a popular payment option for the general public due to its many benefits, such as convenience, low labor costs, fast transaction speed, and so forth. However, online donations to a charity are mostly made by credit cards, debit cards, e-checks, or wire transfer through the charity's website. Although the transactions appear real-time to donors, payments made by credit cards, debit cards, e-checks, or wire transfer can take days to eventually be transferred to the charity's bank account. In addition, underfunded charities and/or individual fundraisers do not always have the luxury to operate and maintain a website for receiving online donations. Not to mention that many people are reluctant to donate to charities that they are not familiar with, in fear of charity fraud. Therefore, systems and/or methods for automatically authenticating, or facilitating a charity vetting server to authenticate, charities and disclosing the charity status to potential donors to prevent fraud are desired. Additionally, systems and methods for processing real-time online donations and making the donation amounts available to the donees in real-time are desired.

BRIEF DESCRIPTION OF THE DRAWINGS

To facilitate further description of the embodiments, the following drawings are provided in which.

Figure 1:
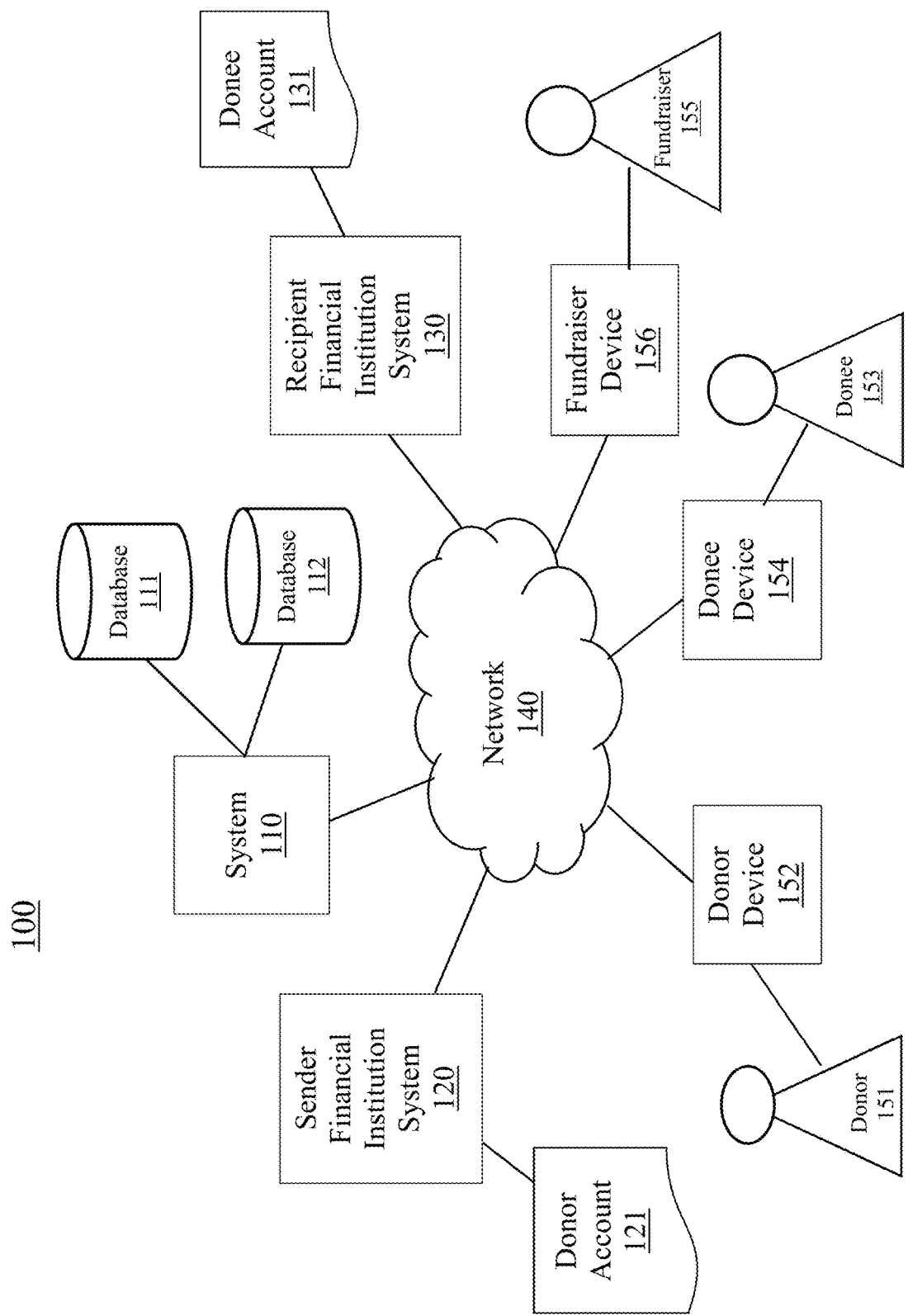
FIG. 1 depicts a schematic diagram of a system that can be adopted for processing real-time online donations, according to an embodiment.

For simplicity and clarity of illustration, the drawing figures illustrate the general manner of construction, and descriptions and details of well-known features and techniques may be omitted to avoid unnecessarily obscuring the present disclosure. Additionally, elements in the drawing figures are not necessarily drawn to scale. For example, the dimensions of some of the elements in the figures may be exaggerated relative to other elements to help improve understanding of embodiments of the present disclosure. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

The terms "couple," "coupled," "couples," "coupling," and the like should be broadly understood and refer to connecting two or more elements mechanically and/or otherwise. Two or more electrical elements may be electrically coupled together, but not be mechanically or otherwise coupled together. Coupling may be for any length of time, e.g., permanent or semi-permanent or only for an instant. "Electrical coupling" and the like should be broadly understood and include electrical coupling of all types. The absence of the word "removably," "removable," and the like near the word "coupled," and the like does not mean that the coupling, etc. in question is or is not removable.

As defined herein, two or more elements are "integral" if they are comprised of the same piece of material. As defined herein, two or more elements are "non-integral" if each is comprised of a different piece of material.

As defined herein, "approximately" can, in some embodiments, mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

As defined herein, "real-time" can, in some embodiments, be defined with respect to operations carried out as soon as practically possible upon occurrence of a triggering event. A triggering event can include receipt of data necessary to execute a task or to otherwise process information. Because of delays inherent in transmission and/or in computing speeds, the term "real-time" encompasses operations that occur in "near" real-time or somewhat delayed from a triggering event. In a number of embodiments, "real-time" can mean real-time less a time delay for processing (e.g., determining) and/or transmitting data. The particular time delay can vary depending on the type and/or amount of the data, the processing speeds of the hardware, the transmission capability of the communication hardware, the transmission distance, etc. However, in many embodiments, the time delay can be less than approximately one second, five seconds, ten seconds, thirty seconds, one minute, or five minutes.

DESCRIPTION OF EXAMPLES OF EMBODIMENTS

Various embodiments include a system comprising one or more processing modules and one or more non-transitory memory storage modules storing computing instructions configured to run on the one or more processing modules and perform certain acts. The acts can include receiving, in real-time and through a computer network, a donation authorization from a donor via a donor user interface executed on a donor device (e.g., a browser executed on a personal computer, an email reader executed on a portable device, or an application executed on a smart phone) of the donor. The donation authorization can comprise: at least one of a donation amount, a donor token for the donor, a donee first token for a donee, and/or donee information. The donor token can be uniquely associated with a donor account for the donor (e.g., a checking account or saving account) maintained by a sender financial institution (e.g., a bank, a credit union, etc.). The donee first token can be uniquely associated with a donee account for the donee, maintained by a receiver financial institution. The acts also can include, after receiving the donation authorization, instructing or facilitating, in real-time and through the computer network, the receiver financial institution to post in real-time the donation amount to the donee account. In some embodiments, facilitating the receiver financial institution to post the donation amount to the donee account can include transmitting a risk score to the receiver financial institution to allow the receiver financial institution to decide whether to receive the donation amount.

In some embodiments, the donation authorization can be: (a) sent to the system, in real-time through the computer network, directly from the donor via the donor user interface executed on the donor device; or (b) relayed to the system, through the computer network, by a server, such as a sender financial institution system operated by the sender financial institution, from the donor via the donor user interface. The donation amount can be debited from the donor account and withheld by the sender financial institution before the system receives the donation authorization, until the sender financial institution settles the transaction with the recipient financial institution. Alternatively, upon receiving the donation authorization from the donor, the system can be configured to instruct or facilitate, in real-time through the computer network, the sender financial institution to debit in real-time the donation amount, and any fees required, from the donor account and withhold the fund to be transferred to the donee account maintained by the receiver financial institution, in real-time or later. In certain embodiments where the system is configured to facilitate the sender financial institution to debit the donation amount and fees, if any, from the donor account, the system can so facilitate by providing a risk score to allow the sender financial institution to decide whether to transfer the donation amount.

In some embodiments, the timing of the settlement of the fund transfer can be independent from when the recipient financial institution posts the donation amount to the donee account. Such implementation is advantageous because the fund settlement between the financial institutions can rely on existing payment processing networks (e.g., the Automated Clearing House ("ACH") network, a debit card network, etc.), rather than to reinvent the wheel.

In many embodiments, the donor token can be a public token (e.g., an email address, a machine-readable code, or a phone number), or a private token (e.g., a social security number, a driver license number, or an account number). The association between the donor token and the donor account can be maintained by the system and/or a server of the sender financial institution. The donee first token can a public token, such as an email address, a machine-readable code, or a phone number, etc. for the donee. The association between the donee first token and the donee account can be maintained and/or accessible by the system and/or a server of the receiver financial institution. Such implementation is advantageous because the donors and/or donees can engage in donation transactions without disclosing their respective confidential financial information.

In a number of embodiments, the donee first token can be associated with a first indication or a second indication. The association between the donee first token and the first or second indication can be stored at a database of the system. When the donee first token is associated with the first indication, the donee information can be uniquely associated with the donee first token. When the donee first token is associated with the second indication, the donee information can be associated with the donee first token and a donee second token. For example, the first indication can indicate that no donee second token is used, and the second indication can indicate that at least one donee second token exists in the donation authorization. A donee second token can be an identifier, uniquely corresponding to a single cause for donation among all of the causes associated with the donee. A cause for donation can include a fundraiser, a fundraising campaign, or the combination thereof. The causes for donation associated with the donee can be stored at the database of the system. A fundraiser can be an individual, a group of individuals, or an entity, such as a subsidiary of the donee or a third-party organization affiliated with the donee, that solicits the donor for donations to the donee or accepts on behalf of the donee unsolicited donations from the donor.

In several embodiments, the donee information additionally or alternatively can comprise donation campaign information for the donee. The donee information can be configured to identify a fundraiser and/or a fundraising campaign. For example, when a donee is a charity running multiple fundraising campaigns for various causes for donation (e.g., scholarships, emergency assistance, disaster reliefs, etc.), and a donor wishes to designate a donation to one of the fundraising campaigns, the donee information can comprise an identifier, such as a donee second token, of the designated fundraising campaign, such as a name of the campaign, a unique number, or a machine-readable code associated with the campaign, etc. In another example, when a donee is an organizer of a fundraising campaign that has multiple competing fundraisers, the donee information can comprise an identifier of a designated fundraiser, such as a donee second token, a name, an email address, a phone number, etc. In yet another example, the donee information can comprise identification information for a designated fundraiser of a designated fundraising campaign, when the donee runs multiple fundraising campaigns, each can involve more than one fundraiser. In some embodiments the identification information for the more than one fundraiser and/or the multiple fundraising campaigns can be stored at the database of the system. In other embodiments the identification information for the more than one fundraiser and/or the multiple fundraising campaigns stored at the database of the system can be searchable via the donor user interface executed on the donor device and/or via a donee user interface executed on a donee device.

In a number of embodiments, the donor user interface can be configured to be executed on the donor device and perform certain steps. The steps performed by the donor user interface, before the donation authorization is sent through the computer network to the system, can include: (a) receiving a donee first token input associated with the donee first token; (b) after receiving the donee first token input, when the donee first token is associated with the second indication, prompting the donor to provide a donee second token input associated with the donee second token; (c) receiving a donation amount input associated with the donation amount; and/or (d) incorporating the donee first token input, the donee second token input, if any, and the donation amount input into the donation authorization. In some embodiments, the donor user interface can comprise various input controls for receiving inputs from the donor (e.g., a text box, a list box, or a searchable drop-down list, etc.) for one or more of the above-mentioned inputs and/or any other inputs.

In some embodiments, the donee information further can comprise a tax exempt status, and at least a portion of the donee information, including the tax exempt status, can be provided to the system, through the computer network, via a donee user interface executed on a donee device of the donee in a registration process before the donor can initiate the donation authorization. The tax exempt status of a donee can include one of: tax-deductible, tax-exempt status pending, or non-tax-deducible, etc. For example, the system in an embodiment can be configured to provide the donee user interface for the donee to provide the portion of the donee information and register or sign up as one of the registered donees in a donee database, and a donor can choose the donee from a list of the registered donees on the donor user interface for making the donation authorization. In some embodiments, the donee user interface also can be configured for a registered donee to maintain its registration information, review and/or search for donations received, and/or print records of transactions processed by the system for bookkeeping, accounting, or auditing purposes, etc.

In similar or different embodiments, the system can be configured to automatically authenticate, or facilitate a charity vetting server to authenticate, in real-time, some or all of the portion of the donee information provided by the donee. For instance, the computing instructions of the system further can be configured to perform: after receiving the donee information from the donee, authenticating, in real-time and through the computer network, the tax exempt status from a tax authority. In some embodiments, the real-time authentication of the tax exempt status by the system can comprise searching, through the computer network, from a database (e.g., a tax exempt organization database of the U.S. Internal Revenue Service (IRS), a nonprofit organization database of a state the donee registers or operates, a private database maintained by a third party, or any public database of an applicable tax authority, etc.), based on any identifying information of the donee (e.g., the tax-exempt number, employer identification number (EIN), tax identification, name, address, and/or state of the donee). In another example, the computing instructions of the system further can be configured to perform: after receiving the donee information from the donee, facilitating, in real-time and through the computer network, the charity vetting server to authenticate the tax exempt status. In a few embodiments, the system can facilitate the charity vetting server to authenticate the tax exempt status by: (a) transmitting, in real-time and through the computer network, the donee information to the charity vetting server to allow the charity vetting server to verify the tax exempt status in real-time based on pertinent data maintained and/or obtained by the charity vetting server, and (b) receiving, through the computer network and from the charity vetting server, a result of the verification of the tax exempt status.

In certain embodiments, the authentication of the tax exempt status in addition, or alternatively, can involve non-real-time authentications or authentications performed by the system, a system administrator, or the charity vetting server to ensure the accuracy and/or to handle errors or exceptions, such as a network or database failure during the automatic authentication by the system or the charity vetting server or a lack of online searchable records regarding the status of nonprofit organizations in a state. In many embodiments, the system further can be configured to deny registration of a donee or block or temporarily suspend the donee from the list of registered donees whose claim of tax exempt status proves to be false so that impostors cannot use the system to commit charity fraud.

In a number of embodiments, upon the donor entering, via the donor user interface and through the computer network, the donee first token and any other information necessary for identifying the recipient of the donation, the system also can be configured to inform the donor about the tax exempt status of the donation to be made and obtain a confirmation from the donor before further processing the donation authorization. This feature can be used in an exemplary scenario where a school allows students to use the account of the school to receive donations for fundraising campaigns for the community, but although the school is a tax exempt entity, the donations made to some of the fundraising campaigns may not be eligible for tax deduction. In some embodiments, the system configured to provide authenticated tax exempt status, in addition to other public information, of a registered donee to a donor via the donor user interface before the donation amount is processed can be advantageous in that the system can lower the risks of charity fraud, that is, fraud committed by imposters and suffered by careless donors who donate to imposters without first checking the legitimacy of the imposters.

In similar or different embodiments, the computing instructions of the system can be further configured to perform: (a) prior to instructing or facilitating the receiver financial institution to post in real-time the donation amount to the donee account, providing, in real-time and through the computer network, a notice associated with the tax exempt status to be displayed on the donor user interface to the donor; and (b) after providing the notice associated with the tax exempt status, receiving, in real-time and through the computer network via the donor user interface, a confirmation from the donor to pay the donation amount as a tax exempt donation. In some embodiments, the notice associated with the tax exempt status further can include a disclaimer, such as a statement that the tax exempt status is determined based on the information available to the system, which can be outdated or incorrect, and is provided for information only.

In a number of embodiments, after instructing or facilitating the receiver financial institution to post in real-time the donation amount to the donee account, the computing instructions of the system further can be configured to perform: providing, in real-time and through the computer network, a donation confirmation to be displayed on at least one of: (a) a donee user interface associated with donee contact information of the donee first token; or (b) a fundraiser user interface associated with fundraiser contact information of the donee information. For example, when a donor authorizes a donation made to a charity and designated to a fundraiser, after the system instructs the bank of the charity to post the donation amount to the bank account of the charity, the system can be configured to send a push notification, an SMS text message, or an email to a contact person of the charity and/or the fundraiser.

In several embodiments, after instructing or facilitating the receiver financial institution to post in real-time the donation amount to the donee account, the computing instructions can be further configured to perform: providing, in real-time and through the computer network via the donor user interface, a receipt of the donation amount to the donor. In some embodiments, the receipt further can include other information, such as a donation tax exempt status, that can be provided by the donee and/or determined by the system or a system administrator based on the donee information. Depending on the local tax laws, a receipt including a donation tax exempt status may be used as a proof of tax deductible gift. In an exemplary embodiment, when it is determined that the donation amount may be tax deductible, the system can be configured to provide a receipt including the name and tax identification of the tax-exempt donee, the donation amount, and a statement that the donation amount, or a portion thereof, is tax deductible. In another embodiment, the system can provide a similar receipt while the statement included in the receipt can state that the donation amount may be eligible for tax deduction, but the receipt is not to be used as proof for tax report purposes. In some embodiments, the system can be configured to provide the receipt in terms of the donation tax exempt status based on a choice of the donee when the donee registers.

In a number of embodiments, the receipt also can include a donee-specific history of donations made by the donor to the donee, such as the number or the total amount of donations by the donor to the donee, the number of donations by the donor to the donee over a period of time (e.g., the past 6 months), and so forth. In some embodiments where the donee information of a donation authorization is configured to identify a fundraiser or a fundraising campaign, the receipt further can include a fundraiser-specific history of donations made by the donor to the fundraiser of the donee or a campaign-specific history of donations made by the donor to the fundraising campaign of the donee.

A number of embodiments include a method being implemented via one or more processing modules and one or more non-transitory memory storage modules storing computing instructions configured to run on the one or more processing modules. The method can include: (a) receiving, in real-time and through a computer network, a donation authorization from a donor via a donor user interface executed on a donor device; (b) after receiving the donation authorization, instructing or facilitating, in real-time and through the computer network, the receiver financial institution to post in real-time the donation amount to the donee account. In an embodiment where the method includes facilitating the receiver financial institution to post the donation amount to the donee account, the facilitating can include providing a risk score to the receiver financial institution to allow the receiver financial institution to decide whether to receive the donation amount.

In some embodiments, the donation authorization can comprise at least one of a donation amount, a donor token for the donor, a donee first token for the donee, and/or donee information. The donor token can be uniquely associated with a donor account for the donor and maintained by a sender financial institution. The donee first token can be uniquely associated with a donee account for the donee and maintained by a receiver financial institution. The donee first token can be associated with a first indication or a second indication, such as an indication of a flag being set or unset. When the donee first token is associated with the first indication, the donee information can be uniquely associated with the donee first token.

In certain embodiments, when the donee first token is associated with the second indication, the donee information further can include or be associated with a donee second token. Examples of the donee second token can include an identifier of a fundraiser, a fundraising campaign, and a category defined based on the purpose of the payment, such as paying membership fees, sponsoring administrative expenses of the donee, or supporting non-specific charity events in a specific geographic area, etc. In some embodiments, the donor user interface used by the donor can be configured to be executed on the donor device and perform: (a) receiving a donee first token input associated with the donee first token; (b) after receiving the donee first token input, when the donee first token is associated with the second indication, prompting the donor to provide a donee second token input associated with a donee second token; (c) receiving a donation amount input associated with the donation amount; and (d) incorporating the donee first token input, the donee second token input, and the donation amount input into the donation authorization. In a number of embodiments, the donee information can comprise donation campaign information for the donee, and can be configured to identify at least one of: a fundraiser or a fundraising campaign. In a few embodiments, the donation campaign information can include the donee second token.

Moreover, the donee information can comprise a tax exempt status, such as tax-deductible, tax-exempt status pending, not-deductible, etc. In some embodiments, at least a portion of the donee information, including the tax exempt status, can be provided by the donee, through the computer network, via a donee user interface executed on a donee device of the donee. In similar or other embodiments, the method further can comprise, after receiving the donee information, authenticating or facilitating a charity vetting server to authenticate, in real-time and through the computer network, the tax exempt status from a tax authority. Such authenticating can be automatically performed by a system or requested by the system to be performed by the charity vetting server at the time the donee signs in as a registered donee in the system or a database or when the system is processing a donation authentication to the donee. The tax authority can include one or more sources of information associated with, or pertinent to the determination of, the tax exempt status, such as an IRS database, state business registration databases, the charity vetting server, or other servers, etc.

In a number of embodiments, the method further can be configured to show the tax exempt status of the donee information to the donor and wait for the donor's confirmation before instructing or facilitating the receiver financial institution to post the donation amount, by: (a) prior to instructing or facilitating the receiver financial institution to post in real-time the donation amount to the donee account, providing, in real-time and through the computer network, a notice associated with the tax exempt status to be displayed on the donor user interface to the donor; and (b) after providing the notice associated with the tax exempt status, receiving, in real-time and through the computer network via the donor user interface, a confirmation from the donor to pay the donation amount as a tax exempt donation.

In some embodiments, after instructing or facilitating the receiver financial institution to post in real-time the donation amount to the donee account, the method also can include providing, in real-time and through the computer network, a donation confirmation to be displayed on at least one of: (a) a donee user interface associated with donee contact information of the donee first token; or (b) a fundraiser user interface associated with fundraiser contact information of the donee information.

In certain embodiments, after instructing or facilitating the receiver financial institution to post in real-time the donation amount to the donee account, the method further can include providing, in real-time and through the computer network via the donor user interface, a receipt of the donation amount to the donor. In some embodiments, the receipt can comprise information associated with at least one of: (a) a donation tax exempt status determined based on the donee information; (b) a donee-specific history of donations made by the donor to the donee; (c) a fundraiser-specific history of donations made by the donor to a fundraiser of the donee; or (d) a campaign-specific history of donations made by the donor to a fundraising campaign of the donee.

Turning to the drawings, FIG. 1 illustrates a block diagram of a system 100 that can be employed for a secure real-time payment transaction network, according to an embodiment. System 100 is merely exemplary and embodiments of the system are not limited to the embodiments presented herein. The system can be employed in many different embodiments or examples not specifically depicted or described herein. In some embodiments, certain elements, systems, subsystems, or modules of system 100 can perform various procedures, processes, and/or activities. In other embodiments, the procedures, processes, and/or activities can be performed by other suitable elements, systems, subsystems, or modules of system 100.

In some embodiments, system 100 can include one or more systems, such as a system 110, one or more financial institution systems, such as a sender financial institution system 120 and/or a recipient financial institution system 130, a plurality of financial accounts, such as a donor account 121 and/or a donee account 131, one or more user computing devices, such as a donor device 152 of a donor 151, a donee device 154 of a donee 153, and/or a fundraiser device 156 of a fundraiser 155. In a number of embodiments, system 110 can include one or more elements, modules, subsystems, and/or systems. In certain embodiments, sender financial institution system 120 can comprise recipient financial institution system 130, or vice versa. In a few embodiments, donor device 152 can comprise donee device 153 and/or fundraiser device 156, or vice versa.

In a number of embodiments, system 110 can comprise one or more processors and one or more non-transitory computer-readable media storing computing instructions configured to run on the one or more processors and perform some acts. In some embodiments, the acts can include: (a) receiving by system 110, in real-time and through a computer network, such as a network 140, a donation authorization from a donor, such as donor 151, via a donor user interface executed on a donor device of the donor, such as donor device 152 of donor 151; and (b) after receiving the donation authorization, instructing or facilitating by system 110, in real-time and through the computer network, such as network 140, a receiver financial institution, such as recipient financial institution system 130, to post in real-time the donation amount to a donee account for a donee, such as donee account 131 for donee 153. In an embodiment where the acts include facilitating the receiver financial institution to post the donation amount to the donee account, the facilitating can include providing a risk score to the one or more of the receiver financial institution or the recipient financial institution to allow one or both of the financial institutions to decide whether to transfer/receive the donation amount.

In a number of embodiments, the donation authorization can comprise one or more of a donation amount, a donor token for donor 151, a donee first token for donee 153, and donee information for donee 153. The donor token can be uniquely associated with a donor account, such as donor account 121, for donor 151 and maintained by a sender financial institution, such as sender financial institution 120. The donee first token can be uniquely associated with donee account 131 for donee 153 and maintained by recipient financial institution 130.

In several embodiments, a single one of the modules, subsystems, or systems in system 110, can be configured to perform all the aforementioned act(s) performed by system 110. In a number of embodiments, a plurality of modules, subsystems, and/or systems in system 110 can be configured to work with each other to perform one or more acts for processing real-time donation authorizations.

Still referring to FIG. 1, in many embodiments, system 110 can be a financial institution, an inter-financial-institution payment network, a third-party real-time payment processor, and so forth. The donor token and/or the donee first token can be an email address, a phone number, a machine readable code, or any suitable identifier corresponding to donor account 121 and/or donee account 131. In some embodiments, the association(s) between the donor token and donor account 121 and/or between the donee token and donee account 131 can be stored in a database, such as database 111 or database 112, communicably connected to system 110, directly or indirectly through network 140.

In certain embodiments similar to or different from that in FIG. 1, system 110 additionally can be a tax exempt entity that is configured to collect, in real-time through network 140, the donation amount from donor account 121 on behalf of donee 153. In some embodiments, donee account 131 can be a trust account or an escrow account that is owned and/or controlled by system 110 and is dedicated to donee 153, individually or with other donees that also agree to such an arrangement. In a number of embodiments, after the donation amount is posted to donee account 131 owned/controlled by system 110, system 110 can be configured to distribute, via network 140, the donation amount to donee 153, in real-time or periodically, such as daily, weekly, biweekly, and so forth. In a few embodiments, system 110 can be configured to charge a fee (e.g., a flat fee or a commission determined based on percentage) by requesting the fee withdrawn from donor account 121 or by deducting the fee from the donation amount that is going to be posted to donee account 131 in real-time and transferred to an account designated by donee 153 later.

Figure 2:
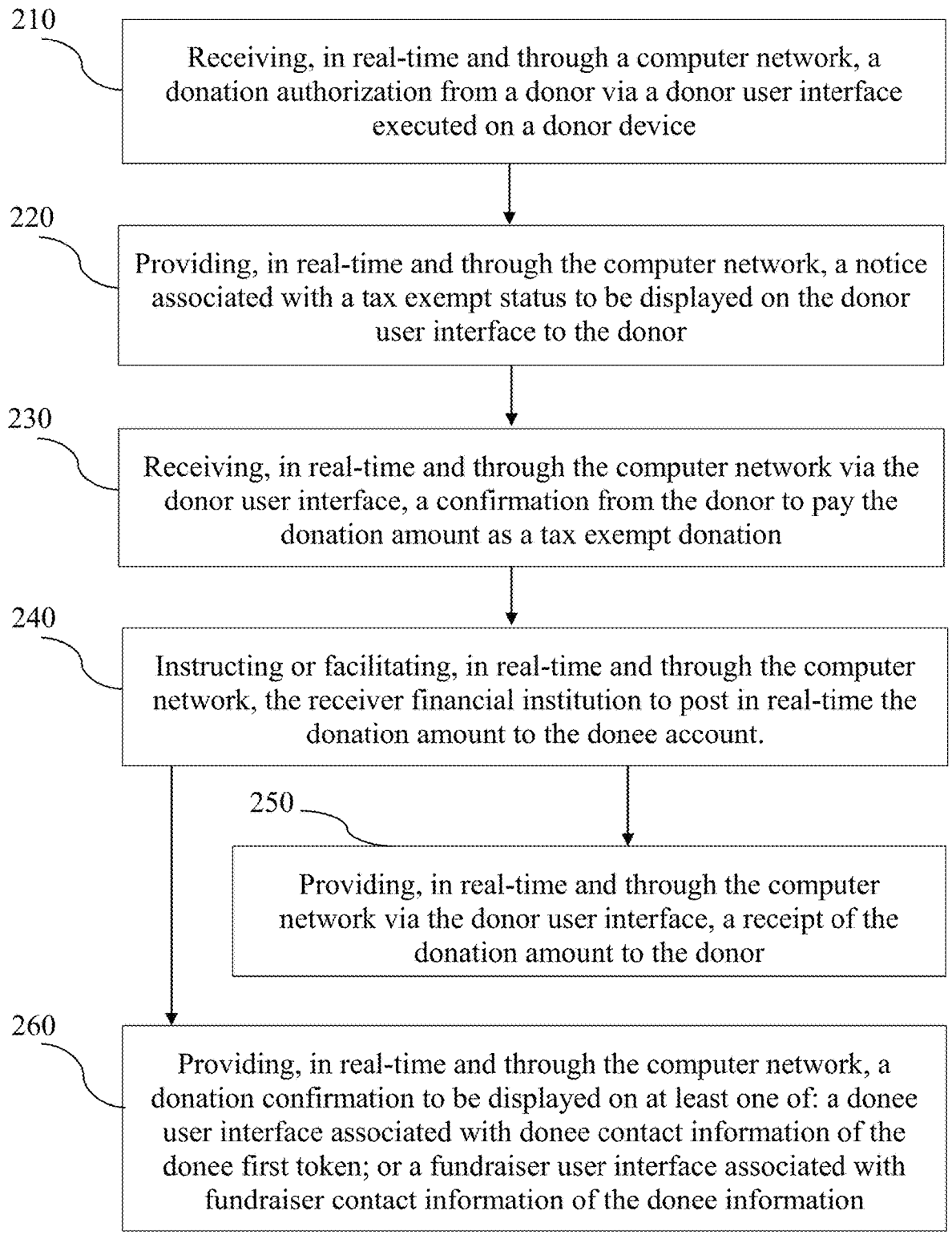
FIG. 2 illustrates a flow chart for a method, according to an embodiment.

Turning ahead in the drawings, FIG. 2 illustrates a flow chart for a method 200, according to an embodiment. In some embodiments, method 200 can be a method of processing real-time donation authorizations. Method 200 is merely exemplary and is not limited to the embodiments presented herein. Method 200 can be employed in many different embodiments or examples not specifically depicted or described herein. In some embodiments, the procedures, the processes, and/or the activities of method 200 can be performed in the order presented. In other embodiments, the procedures, the processes, and/or the activities of method 200 can be performed in any suitable order. In still other embodiments, one or more of the procedures, the processes, and/or the activities of method 200 can be combined or skipped. In some embodiments, method 200 can be performed by system 100 and/or system 110 (FIG. 1).

Referring to FIG. 2, in some embodiments, method 200 can include one or more blocks. Specifically, method 200 can include block 210 of a system receiving in real-time and through a computer network, a donation authorization from a donor via a donor user interface executed on a donor device. The system can be similar or identical to system 100 and/or system 110 (FIG. 1). The computer network can be similar or identical to network 140 (FIG. 1). The donor device can be similar or identical to donor device 152 (FIG. 1).

In a number of embodiments, the donation authorization can comprise a donation amount, a donor token for a donor, such as donor 151 (FIG. 1), a donee first token for a donee, such as donee 153 (FIG. 1), and donee information for the donee. The donor token can be uniquely associated with a donor account, such as donor account 121 (FIG. 1), for the donor and maintained by a donor financial institution, such as sender financial institution system 120 (FIG. 1). The donee first token can be uniquely associated with the donee account for the donee and maintained by a receiver financial institution, such as recipient financial institution system 130 (FIG. 1). In certain embodiments, the donation authorization further can include a processing fee or a commission to be charged by the system, the sender financial institution, the receiver financial institution, or an electronic fund-transfer system, etc.

In certain embodiments, the donation authorization the system receives can be processed and relayed to the system by a sender financial institution, such as sender financial institution system 120 (FIG. 1). For example, after receiving the donation authorization from the donor, the sender financial institution can be configured to perform certain acts or methods to detect fraud or money laundering by the donor and/or the donee and/or to withhold the donation amount, and any applicable fees, from a donor account for the donor, such as donor account 121 (FIG. 1), before forwarding the donation authorization to the system. Alternatively, as noted below, one or more of these acts can be performed by the system after the sender financial institution forwards the donation authorization to the system.

In some embodiments, the donation authorization can be submitted, through the computer network, directly by the donor device to the system, and method 200 or block 210 further can include the system detecting fraud or money laundering after receiving the donation authorization from the donor device. In different or similar embodiments, method 200 or block 210 further can include the system confirming with the sender financial institution whether there is a high risk of fraud associated with the donation authorization and/or the donor account or whether there is a high risk of the account being overdrawn as a result of the donation authorization, after receiving the donation authorization directly from the donor device. In several embodiments, method 200 or block 210 further can include the system instructing or facilitating the sender financial institution to transfer, in real-time, asynchronous, or offline, the donation amount, via a payment network (e.g., network 140, the ACH network, a debit card network, etc.), to the receiver financial institution.

Still referring to FIG. 2, in some embodiments, method 200 further can include block 220 of the system, such as system 100 or 110 (FIG. 1), providing, in real-time and through the computer network, such as network 140 (FIG. 1), a notice associated with a tax exempt status to be displayed on the donor user interface to the donor, such as donor 151 (FIG. 1). Examples of the notice can include a request for confirmation from the donor to proceed with the donation in view of the tax exempt status; an indication (e.g., a symbol or an image) that the donation may or may not qualify for tax deduction; and/or a description of the tax exempt status, optionally with a disclaimer concerning the accuracy of the tax exempt status. Block 220 can make the donor aware of whether the donee is, or is not, a charity as claimed and help the donor to make an informed decision to donate.

In certain embodiments, method 200 also can include block 230 of the system, such as system 100 or 110 (FIG. 1), receiving, in real-time and through the computer network, such as network 140 (FIG. 1), via the donor user interface, a confirmation from the donor, such as donor 151 (FIG. 1), to pay the donation amount as a tax exempt donation (e.g., when the tax exempt status is tax-deductible or tax-exempt status pending) or a non-tax-deductible gift (e.g., when the tax exempt status is non-tax-deductible). In some embodiments, block 230 also can include receiving, in real-time and through the computer network, via the donor user interface, a cancellation of this transaction from the donor because the donor changes his/her mind, because the donee is not what it claims to be, such as it not being a tax-exempt entity as claimed, or for any other reasons.

In a number of embodiments, method 200 further can include block 240 of the system, such as system 100 or 110 (FIG. 1), instructing or facilitating, in real-time and through the computer network, such as network 140 (FIG. 1), the receiver financial institution, such as recipient financial institution system 130 (FIG. 1), to post in real-time the donation amount to the donee account, such as donee account 131 (FIG. 1), maintained by the receiver financial institution. In some embodiments of block 240 that include facilitating the receiver financial institution to post the donation amount to the donee account, the facilitating can include providing a risk score to the one or more of the receiver financial institution or the recipient financial institution to allow one or both of the financial institutions to decide whether to transfer/receive the donation amount.

Still referring to FIG. 2, in some embodiments, after instructing or facilitating the receiver financial institution to post the donation amount, method 200 further can include block 250 of the system providing, in real-time and through the computer network, such as network 140 (FIG. 1), via the donor user interface executing on the donor device, such as donor device 152 (FIG. 1), a receipt of the donation amount to the donor, such as donor 151 (FIG. 1). In certain embodiments, the receipt further can comprise information associated with at least one of: (a) a donation tax exempt status determined based on the donee information; (b) a donee-specific history of donations made by the donor to the donee; (c) a fundraiser-specific history of donations made by the donor to a fundraiser of the donee; or (d) a campaign-specific history of donations made by the donor to a fundraising campaign of the donee. In certain embodiments, the information provided by the system in the receipt also can be determined based on the requirements of a local tax authority (e.g., the tax rules of the city, state, or country where the donor, the donee, and/or the system is located). In some embodiments, the receipt issued by the system can be used for claiming charitable deductions as part of the donor's subsequently filed taxes. In certain embodiments, the receipt provided by the system further can include a statement that the donee will later provide a formal receipt for tax filing purposes.

In a number of embodiments, after instructing or facilitating the receiver financial institution to post the donation amount, method 200 further can include block 260 of the system providing, in real-time and through the computer network, a donation confirmation to be displayed on at least one of: (a) a donee user interface associated with donee contact information of the donee first token (e.g., an email reader associated with the email address of the donee whose donee first token is a phone number); or (b) a fundraiser user interface associated with fundraiser contact information of the donee information (e.g., an SMS (short message service) text reader associated with the phone number of the fundraiser).

Figure 3:
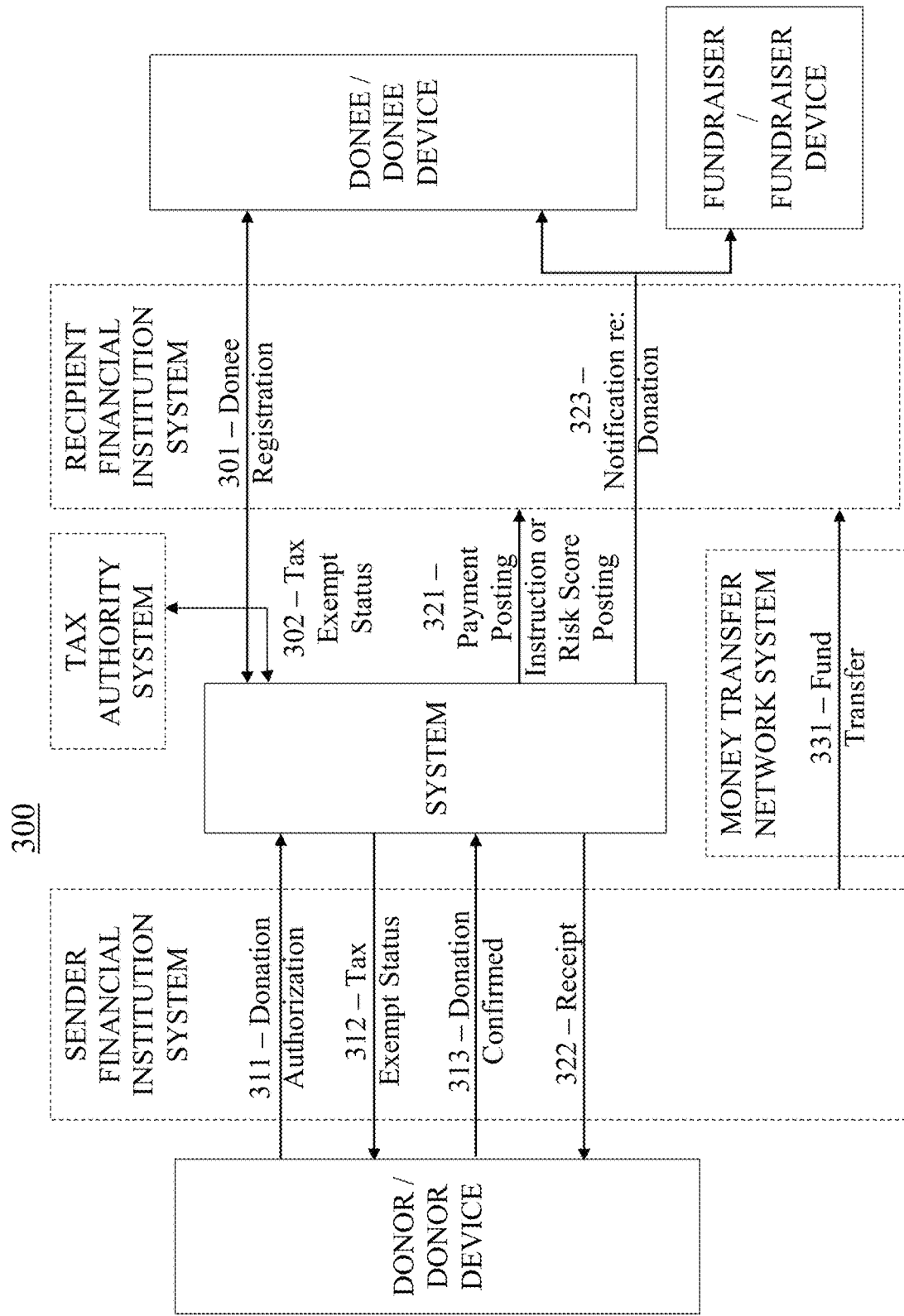
FIG. 3 illustrates a flow chart for a method, according to another embodiment.

Turning ahead in the drawings, FIG. 3 illustrates a flow chart for a method 300, according to an embodiment. In some embodiments, method 300 can be a method of processing real-time donation authorizations. Method 300 is merely exemplary and is not limited to the embodiments presented herein. Method 300 can be employed in many different embodiments or examples not specifically depicted or described herein. In some embodiments, the procedures, the processes, and/or the activities of method 300 can be performed in the order presented. In other embodiments, the procedures, the processes, and/or the activities of method 300 can be performed in any suitable order. In still other embodiments, one or more of the procedures, the processes, and/or the activities of method 300 can be combined or skipped. In some embodiments, method 300 can be performed by system 100 and/or system 110 (FIG. 1). In a few embodiments, one or more procedures, processes, and/or activities of method 300 can be similar or identical to one or more procedures, processes, and/or activities of method 200 (FIG. 2).

Referring to FIG. 3, in some embodiments, method 300 can include one or more steps. Specifically, in a number of embodiments, method 300 can include a step 301 of a system accepting a donee registration by receiving donee information provided, through the computer network, by a donee via a donee user interface executed on a donee device of the donee, such as DONEE DEVICE. SYSTEM can be similar or identical to system 100 and/or system 110 (FIG. 1). SYSTEM can be configured to maintain a registered donee database, such as database 111 and/or database 112 (FIG. 1). The computer network can be similar or identical to network 140 (FIG. 1). In many embodiments, the donee can be associated with a donee first token, such as an email address, a barcode, or a phone number of the donee. DONEE DEVICE can be similar or identical to donee device 154 (FIG. 1). The donee first token can be uniquely associated with a donee account for the donee, such as donee account 131 (FIG. 1), and maintained by a receiver financial institution, such as RECIPIENT FINANCIAL INSTITUTION SYSTEM or recipient financial institution system 130 (FIG. 1). The donee first token can include donee contact information or be associated with a donee profile that comprises the donee contact information. The donee profile can be provided to the donee and to be stored at the system. The donee first token further can be associated with a first indication or a second indication, such as two opposite statuses of a flag indicating whether the donee information includes a donee second token (e.g., an identifier of a fundraising campaign or a fundraiser) for the donee.

In a number of embodiments, the donee information can include a tax exempt status and/or donation campaign information. The tax exempt status can include tax-deductible, tax exempt status pending, non-tax-deductible, etc. In some embodiments, the donee information further can be configured to identify one or more fundraisers and/or one or more fundraising campaigns. In certain embodiments, the donee information can include a respective tax exempt status assigned to each of the one or more fundraisers and/or one or more fundraising campaigns. For example, a charity as a donee can solicit donations for different funds, such as funds to award scholarships in different schools, to help families in urgent need, and/or to cover other expenses, not all of which qualify for tax deductions. In this example, the donee information provided by the donee further can include information of different simultaneous fundraising campaigns so that once the donee registers, the system can prompt donors to choose from the different funds when the donors make contributions to the donee via the system. In another example, a donee can act as an authorized agent to collect donations for small third-party charity organizations, and each of the third-party charity organizations can be assigned a different fundraising campaign identifier and have a respective tax exempt status independent of the donee's own tax exempt status. In a few embodiments, the donee registration of step 301 can be performed through the recipient financial institution system. For instance, the recipient financial institution system can provide a website for the donee to input the donee information and sign up with the system as a registered donee.

In some embodiments, method 300 further can include a step 302 of the system verifying, in real-time and via the computer network, the tax exempt status provided by the donee using the donee device with at least one tax exempt status authentication system, such as TAX AUTHORITY SYSTEM. The at least one tax exempt status authentication system can include a portal of a federal or local tax authority (e.g., the tax department of the government of the United States, a state, or a city, etc.), a server maintained by the system, and/or a third-party server (e.g., a third-party charity vetting server), each configured to authenticate the tax exempt status based on the donee information, including the name, address, EIN, a taxpayer ID, and/or a tax exempt number of the donee. Step 302 can be performed by the system once (e.g., when the donee signs up as a registered donee), periodically, or every time when a donor inquires or immediately before a donation is made. In certain embodiments, step 302 can be skipped.

Still referring to FIG. 3, in many embodiments, method 300 also can include a step 311 of the system receiving, in real-time and through the computer network, a donation authorization from the donor via the donor user interface executed on the donor device. Step 311 can be similar or identical to block 210 (FIG. 2). In some embodiments, the system can receive the donation authorization directly from the donor device or from the sender financial institution when the sender financial institution provides the donor user interface to be executed on the donor deice to receive the donation authorization from the donor. The donation authorization can comprise a donation amount, a donor token for the donor, a donee first token for a donee, and donee information. The donor token can be uniquely associated with a donor account, such as donor account 121 (FIG. 1), for the donor and maintained by a sender financial institution, such as SENDER FINANCIAL INSTITUTION SYSTEM or sender financial institution 120 (FIG. 1). The donee first token can be similar or identical to the donee first token of step 301. The donee information of the donation authorization can be similar or identical to the donation information of step 301 or can comprise a portion of the donation information of step 301, such as the donee second token.

In a number of embodiments, method 300 further can include a step 312 of the system transmitting, in real-time and through the computer network, the tax exempt status associated with the donation authorization to the donor device, after step 311. Step 312 can be similar or identical to block 220 (FIG. 2). The tax exempt status, an explanation and/or an indication thereof, can be displayed on the donor user interface executed on the donor device for the donor to confirm the donation authorization of step 311. For example, the system can be configured to cause the donor user interface to show a new webpage or a pop-up dialog box showing the tax exempt status associated with the donation authorization of step 311 and asking the donor to press a first button to indicate the donor's confirmation or a second button to cancel the donation authorization.

In some embodiments, method 300 further can include a step 313 of the system receiving, in real-time and through the computer network, a donation confirmation from the donor via the donor device, after step 312. Step 313 can be similar or identical to block 230 (FIG. 2). In certain embodiments, the tax exempt status of step 312 and/or the donation confirmation of step 313 can be transmitted directly between the system, via the computer network, or indirectly through the sender financial institution. For example, a donor can initiate the real-time donation authorization at an online banking website of the sender financial institution in step 311. After step 311, depending on the implementation of steps 312 & 313, the donor can be directed to a separate website (e.g., a payment processing website of the system) to directly communicate with the system, or the donor can stay at the online banking website to finish the transaction.

Still referring to FIG. 3, in many embodiments, method 300 additionally can include a step 321 of the system instructing or facilitating, in real-time and through the computer network, the receiver financial institution to post in real-time the donation amount to the donee account, after steps 311, 312, and/or 313. Step 321 can be similar or identical to block 240 (FIG. 2).

In a number of embodiments, method 300 further can include a step 322 of the system providing, in real-time and through the computer network, a receipt of the donation amount to be displayed on the donor user interface of the donor device to the donor, after step 321. Step 322 can be similar or identical to block 250 (FIG. 2). The receipt can comprise information associated with at least one of: (a) a donation tax exempt status determined based on the donee information; (b) a donee-specific history of donations made by the donor to the donee; (c) a fundraiser-specific history of donations made by the donor to a fundraiser of the donee; or (d) a campaign-specific history of donations made by the donor to a fundraising campaign of the donee information. The receipt can be sent by the system to the donee device directly or through the sender financial institution.

In some embodiments, method 300 also can include, after step 321, a step 323 of the system providing, in real-time and through the computer network, a notification regarding the donation to be displayed on at least one of: (a) a donee user interface associated with donee contact information of the donee first token; or (b) a fundraiser user interface associated with fundraiser contact information of the donee information, if the donee information of the donation authorization is associated with a fundraiser. Step 323 can be similar or identical to block 260 (FIG. 2).

In certain embodiments, method 300 further can include, after step 321, a step 331 of the sender financial institution transferring funds associated with the donation authorization to the recipient financial institution. The funds can include the donation amount withdrawn from the donor account and withheld by the sender financial institution before step 321. The fund transfer of step 331 can be conducted directly or indirectly via a money transfer network, such as MONEY TRANSFER NETWORK SYSTEM.

Figure 4:
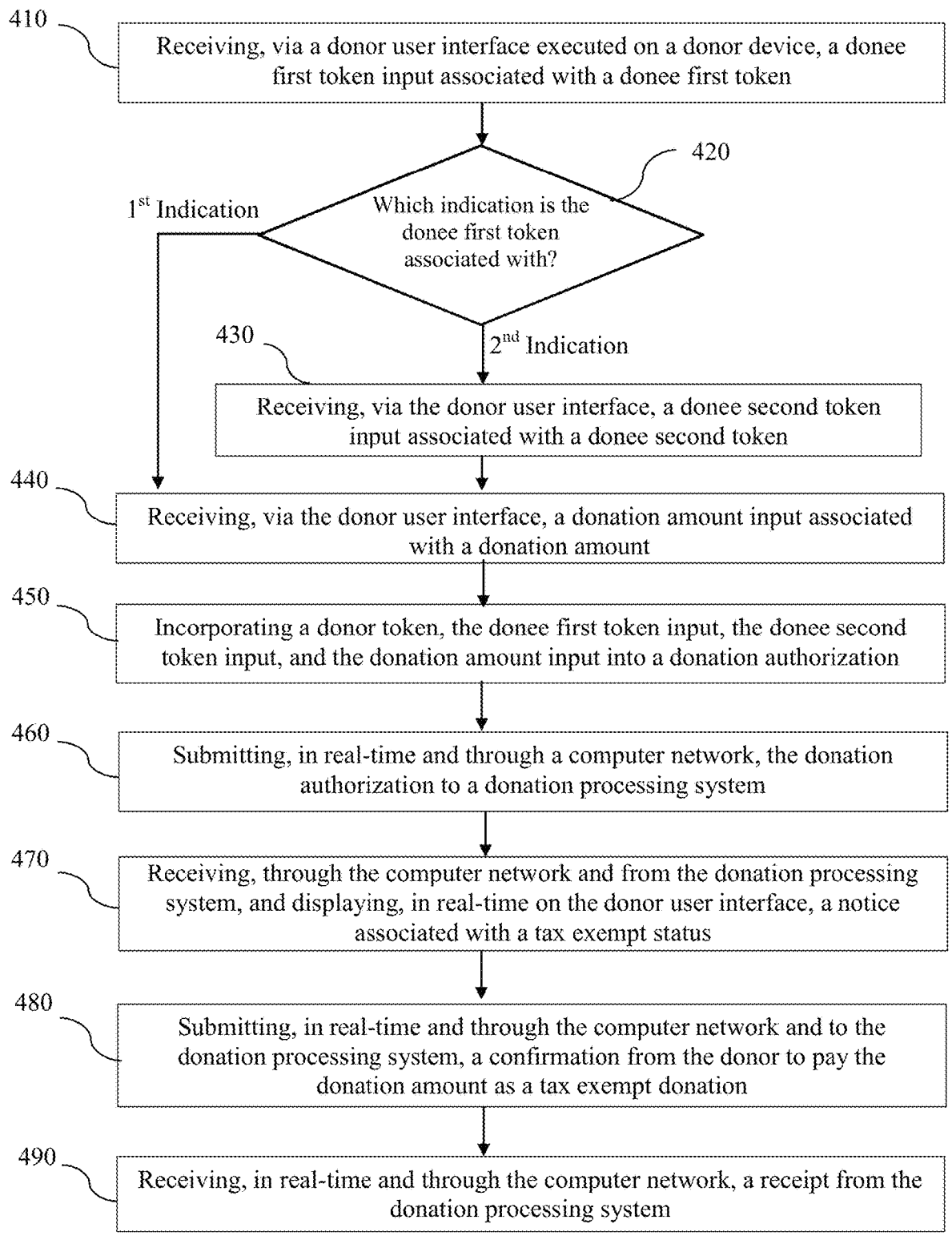
FIG. 4 illustrates a flow chart for a method, according to an embodiment.

Turning ahead in the drawings, FIG. 4 illustrates a flow chart for a method 400, according to an embodiment. In some embodiments, method 400 can be a method of a donor device processing a real-time donation authorization by a donor operating the donor device. Method 400 is merely exemplary and is not limited to the embodiments presented herein. Method 400 can be employed in many different embodiments or examples not specifically depicted or described herein. In some embodiments, the procedures, the processes, and/or the activities of method 400 can be performed in the order presented. In other embodiments, the procedures, the processes, and/or the activities of method 400 can be performed in any suitable order. In still other embodiments, one or more of the procedures, the processes, and/or the activities of method 400 can be combined or skipped. In some embodiments, method 400 can be performed by donor device 152 (FIG. 1) or DONOR DEVICE (FIG. 3).

Referring to FIG. 4, in some embodiments, method 400 can include one or more blocks. Specifically, in a number of embodiments, method 400 can include a block 410 of a donor device receiving, via a donor user interface executed on the donor device, a donee first token input associated with a donee first token. The donor device can be similar or identical to donor device 152 (FIG. 1) or DONOR DEVICE (FIG. 3). The donee first token can be uniquely associated with a donee account, such as donee account 131 (FIG. 1), for a donee, such as donee 153 (FIG. 1), and maintained by a receiver financial institution, such as recipient financial institution system 130 (FIG. 1) or RECIPIENT FINANCIAL INSTITUTION SYSTEM (FIG. 3). In some embodiments, the donee can be one of the registered donees registered with a donation processing system, such as system 100 or 110 (FIG. 1) or SYSTEM (FIG. 3).

The donor user interface can be a webpage or a graphical user interface of a software program. The webpage can be obtained, through a computer network, such as network 140 (FIG. 1), from the donation processing system or a sender financial institution, such as sender financial institution system 120 (FIG. 1) or SENDER FINANCIAL INSTITUTION SYSTEM (FIG. 3). Examples of the donee first token input can include one or more of input controls, such as a textbox configured to receive a text entered by the donor, a voice control configured to receive and interpret a spoken command by the donor, a barcode reader configured to scan a barcode, a pull-down menu listing one or more donees for the donor to choose from, and so forth. In certain embodiments, block 410 further can include the donor device retrieving, through the computer network, a list of registered donees from the donation processing system to be displayed on the donor user interface for the donor to choose from.

In a number of embodiments, method 400 also can include a block 420 of the donor device determining which indication the donee first token is associated with. The donee first token can be associated with one of multiple different indications. For example, the donee first token can be associated with either the first indication or the second indications, and the first indication and the second indications can represent NO or YES, respectively, or vice versa, concerning whether a donee second token can be used for making a donation to the donee. The donor device can make the determination of block 420 by one or more of: (a) accessing a remote database (e.g., databases 111 and/or 112 (FIG. 1)) that stores such information; (b) requesting, in real-time through the computer network, this information from the donation processing system or the sender financial institution; or (c) receiving, via the donor user interface, an indication input (e.g., a checkbox, an textbox, a pull-down menu, a voice control, etc.) associated with which indication the donee first token is associated with.

In certain embodiments, method 400 further can include a block 430 of the donor device receiving, via the donor user interface, a donee second token input associated with a donee second token of the donee, after block 420 determines that the donee first token is associated with the second indication (e.g., indicating that the donee second token can be used). The donee second token can comprise an identifier, such as a number, a name, an email, a phone number, etc., that is configured to identify one or one or more fundraisers and/or a fundraising campaigns associated with the donee.

In some embodiments, method 400 further can include a block 440 of the donor device receiving, via the donor user interface, a donation amount input associated with a donation amount. The donation amount input can comprise one or more input controls of: a textbox, a set of predetermined buttons or options in a pull-down menu, a voice control, etc. Block 440 can occur after block 430 or after block 420 determines that the donee first token is not associated with the second indication (e.g., indicating that the donee second token cannot be used).

In a number of embodiments, method 400 further can include a block 450 of the donor device incorporating: (a) a donor token, (b) the donee first token input, (c) the donee second token input, if any, and (d) the donation amount input into a donation authorization. The donor token can be uniquely associated with a donor account for the donor and maintained by the sender financial institution. The donation authorization can be similar or identical to the donation authorization of block 210 (FIG. 2) or step 311 (FIG. 3).

In several embodiments, method 400 further can include a block 460 of the donor device submitting, in real-time and through the computer network, the donation authorization to the donation processing system (e.g., system 100 or 110 (FIG. 1) or SYSTEM (FIG. 3)). In a number of embodiments, upon receiving the donation authorization, the donation processing system can be configured to process the donation authorization by performing one or more procedures, processes, and/or activities of method 200 (FIG. 2) or method 300 (FIG. 3), such as blocks 210 and/or 240 (FIG. 2) or steps 311 and/or 321 (FIG. 3). In some embodiments, the donor device can submit the donation authorization to the sender financial institution (either directly or via an intermediate system such as system 110 (FIG. 1), and the sender financial institution can be configured to process the donation authorization in a way similar to or different from the sender financial institution described in method 200 (FIG. 2) or method 300 (FIG. 3), before forwarding, in real-time through the computer network, the donation authorization to the donation processing system. For example, the sender financial institution and/or the intermediate system can process the donation authorization by one or more of: (a) detecting, in real-time, fraud or money laundering by the donor and/or the donee; or (b) debiting, in real-time, a fund including the donation amount plus any fees, from the donor account and temporarily withholding the fund in a trust account.

Still referring to FIG. 4, in some embodiments, method 400 also can include a block 470 of the donor device receiving, through the computer network and from the donation processing system, and displaying or providing instructions to display, in real-time on the donor user interface, a notice associated with a tax exempt status, after the donor device submitted the donation authorization in block 460. In a few embodiments, the donation processing system can be configured to authenticate, or facilitate a charity vetting server to authenticate, the tax exempt status, in real-time and through the computer network from a tax authority (e.g., the IRS portal, the charity vetting server, a database, or a third-party server, etc.), after receiving the donation authorization from the donor device (e.g., block 460) and before providing (or providing instructions to display) the notice associated with the tax exempt status. The notice can be similar or identical to the notice of block 220 (FIG. 2) or step 312 (FIG. 3).

In a number of embodiments, method 400 also can include a block 480 of the donor device submitting, in real-time and through the computer network and to the donation processing system, a confirmation from the donor to pay the donation amount as a tax exempt donation. The confirmation can be similar or identical to the confirmation of block 230 (FIG. 2) or step 313 (FIG. 3). The donor device can be configured to receive the confirmation from the donor when the donor clicks or presses a button on the donor user interface or when the donor gives a spoken command.

Still referring to FIG. 4, in several embodiments, method 400 further can include a block 490 of the donor device receiving, in real-time and through the computer network, a receipt from the donation processing system, after the donation processing system receives and processing the donation authorization of block 480. The receipt can be similar or identical to the receipt of block 250 (FIG. 2) or step 322 (FIG. 3).

Figure 5:
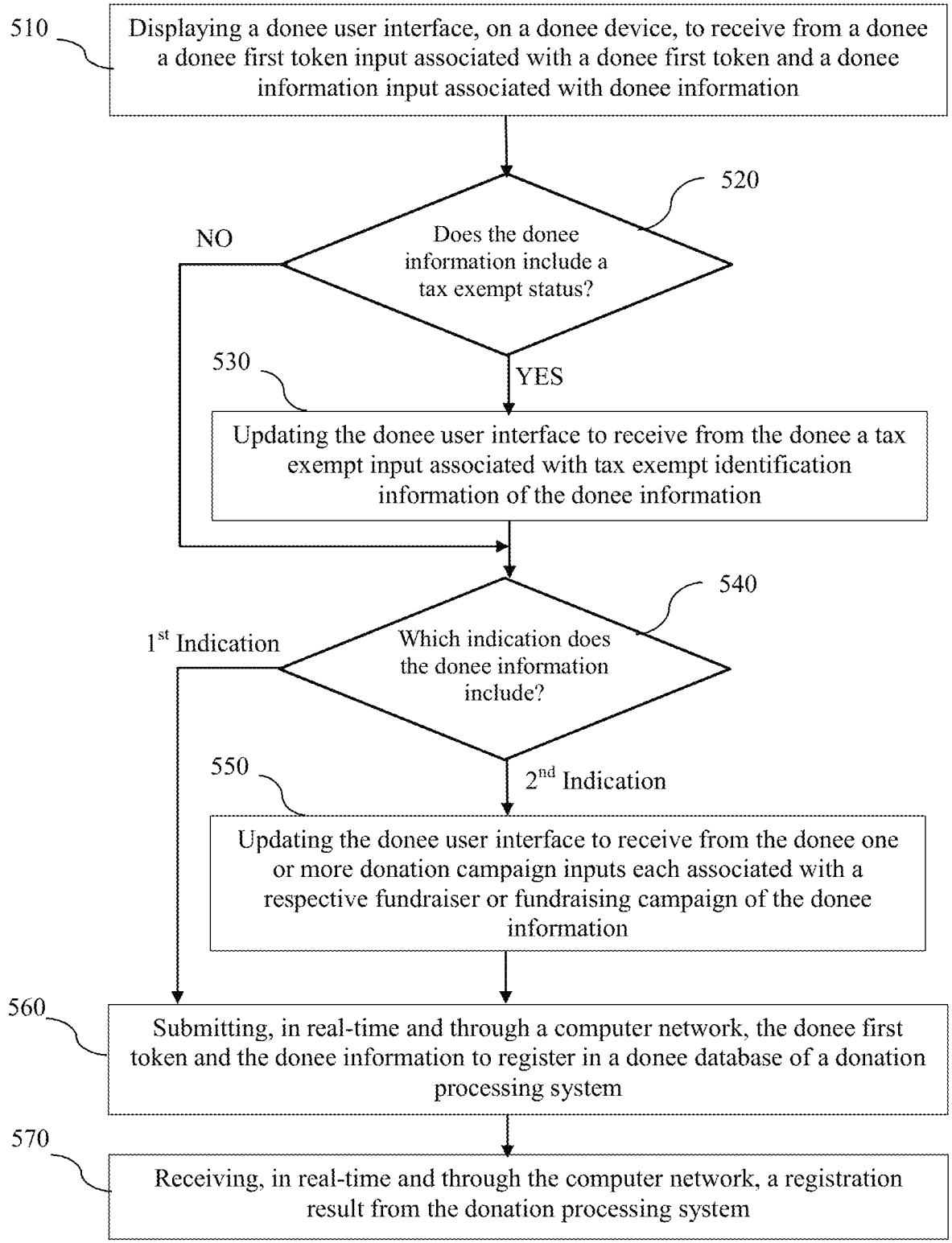
FIG. 5 illustrates a flow chart for a method, according to an embodiment.

Turning ahead in the drawings, FIG. 5 illustrates a flow chart for a method 500, according to an embodiment. In some embodiments, method 500 can be a method of a donee device processing a donee registering with a donation processing system by the donee operating the donee device. Method 500 is merely exemplary and is not limited to the embodiments presented herein. Method 500 can be employed in many different embodiments or examples not specifically depicted or described herein. In some embodiments, the procedures, the processes, and/or the activities of method 500 can be performed in the order presented. In other embodiments, the procedures, the processes, and/or the activities of method 500 can be performed in any suitable order. In still other embodiments, one or more of the procedures, the processes, and/or the activities of method 500 can be combined or skipped. In some embodiments, method 500 can be performed by donee device 154 (FIG. 1) or DONEE DEVICE (FIG. 3). In a few embodiments, the donation processing system can be system 100 or 110 (FIG. 1), or SYSTEM (FIG. 3).

Referring to FIG. 5, in some embodiments, method 500 can include one or more blocks. Specifically, in a number of embodiments, method 500 can include a block 510 of a donee device executing and displaying a donee user interface to receive from a donee a donee first token input associated with a donee first token and a donee information input associated with donee information. The donee device can be similar or identical to donee device 154 (FIG. 1) or DONEE DEVICE (FIG. 3). The donee first token can be uniquely associated with a donee account, such as donee account 131 (FIG. 1), for a donee, such as donee 153 (FIG.

1), and maintained by a receiver financial institution, such as recipient financial institution system 130 (FIG. 1) or RECIPIENT FINANCIAL INSTITUTION SYSTEM (FIG. 3). The donee information can include various information associated with the donee, such as a name, a password, an entity type, a mailing address, an email address, a phone number, the donee account, the receiver financial institution, an employer identification number (EIN), and so forth.

The donee user interface can include a webpage to be displayed in a web browser, a graphical user interface of a software program (e.g., a mobile app), and so forth. The webpage can be downloaded, through a computer network, such as network 140 (FIG. 1), from the donation processing system or a receiver financial institution, such as recipient financial institution system 130 (FIG. 1) or RECIPIENT FINANCIAL INSTITUTION SYSTEM (FIG. 3). The donee user interface further can comprise one or more input controls to receive user inputs, such as the donee first token input, and examples of each of the one or more input controls can include a textbox configured to receive a text entered by the donee, a voice control configured to receive and interpret a spoken command by the donee, a barcode reader configured to scan a barcode associated with the donee first token, a pull-down menu, and so forth.

In a number of embodiments, method 500 also can include a block 520 of the donee device determining whether the donee information provided by the donee includes a claim of a tax exempt status (e.g., an assertion that the donee has obtained, or will obtain, the tax exempt status under the U.S. Internal Revenue Code section 501(c)(3)). For example, the donee user interface of block 510 can include a checkbox with a label, "This organization has acquired a § 501(c)(3) tax-exempt status" or "The § 501(c)(3) tax-exempt status of this organization is approved or pending," and by the donee clicking the checkbox, the donee device includes in the donee information a claim that a donation to the donee may be tax deductible for the donor. In another example, the donee can indicate its tax exempt status in the donee information by entering a type of the organization as a "non-profit corporation" or a "public school," etc., at the donee user interface of block 510.

In several embodiments, method 500 further can include a block 530 of the donee device, after determining in block 520 that the donee information includes a tax exempt status, updating the donee user interface to receive from the donee a tax exempt input associated with tax exempt identification information of the donee information. The tax exempt identification information of the donee information can include the donee's name, EIN, city and state, tax exempt identifier, and/or other identifying information that can be used for various purposes, such as shown on a receipt provided by the donation processing system for a donor to claim tax deductions or used by the donation processing system to authenticate, or facilitate a charity vetting server to authenticate, the tax exempt status of the donee. The donee user interface can be updated to show a control configured to receive the tax exempt input, and the control can be originally hidden in the donee user interface, downloaded from a server and inserted into the donee user interface, or displayed in the newly downloaded donee user interface.

In some embodiments, method 500 also can include a block 540 of the donee device determining whether the donee information includes a first indication or a second indication. For example, the donee user interface can include a checkbox with a label, "Do you want to specify the categories of donation?" or "Can a donor designate a fundraiser or a fundraising campaign?". In this example, when the checkbox is unchecked, the donee information can include the first indication, and when the checkbox is checked, the donee information can include the second indication. Block 540 can occur after block 530 or after determining in block 520 that the donee information does not include a tax exempt status.

In a number of embodiments, method 500 further can include a block 550 of the donee device, after determining in block 540 that the donee information includes the second indication, updating the donee user interface to receive from the donee one or more donation campaign inputs each associated with a respective fundraiser or fundraising campaign of the donee information. Examples of the one or more donation campaign inputs can include inputs for a fundraiser/campaign identification number, a fundraiser name, a fundraiser contact information, a campaign name, a campaign period, a campaign special event (e.g., a matching gift program, etc.), and so forth.

In some embodiments, method 500 further can include a block 560 of the donee device submitting, in real-time and through a computer network, the donee first token and the donee information to register in a donee database of the donation processing system. The donee database can be similar or identical to database 111 or 112 (FIG. 1). Upon receiving the donee first token and the donee information, the donation processing system can be configured to take one or more of the following actions in real-time: (a) confirming whether the donee first token already exists in the donee database or is owned by the donee (e.g., sending an SMS text message to a cell phone number used as the donee first token); (b) checking the format of each of the user inputs; or (c) authenticating the correctness of the user inputs, such as checking whether the EIN matches the name, confirming the zip code of the address, or authenticating, or facilitating a charity vetting server to authenticate, the tax exempt status of the donee information with an online server (e.g., TAX AUTHORITY SYSTEM (FIG. 3)), if the donee claims the tax exempt status. In different or similar embodiments, other blocks of method 500 also can include submitting, in real-time through the computer network, information to the donation system for pre-processing. For example, in some embodiments, block 510 further can include submitting the donee first token to the donation processing system for verification before proceeding to other blocks.

In several embodiments, method 500 further can include a block 570 of the donee device receiving, in real-time and through the computer network, a registration result from the donation processing system. For example, the donation processing system can return (1) a message indicating that the registration is successful or (2) an error message about some missing or incorrect information of the donee information provided. In some embodiments, block 570, upon receiving an error message, further can include determining where the error comes from and going back to the corresponding block to correct the error. For example, if the authentication of the tax exempt status fails, block 570 can include going back to block 530 so that the donee can correct any errors in the tax exempt status, and then repeating blocks 560 and 570.

Figure 6:
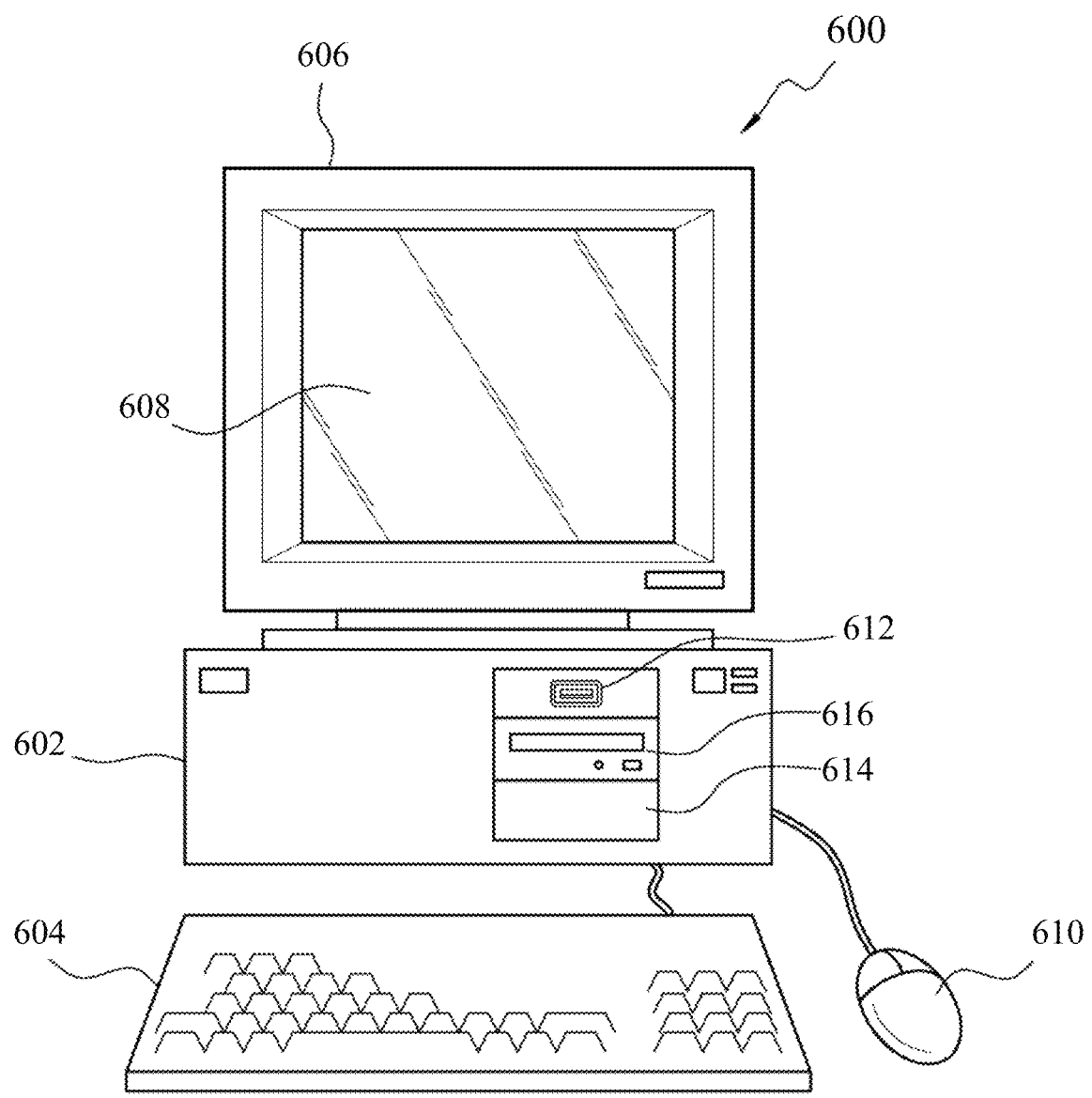
FIG. 6 illustrates a computer that is suitable for implementing an embodiment of components of the system of FIG. 1.
Figure 7:
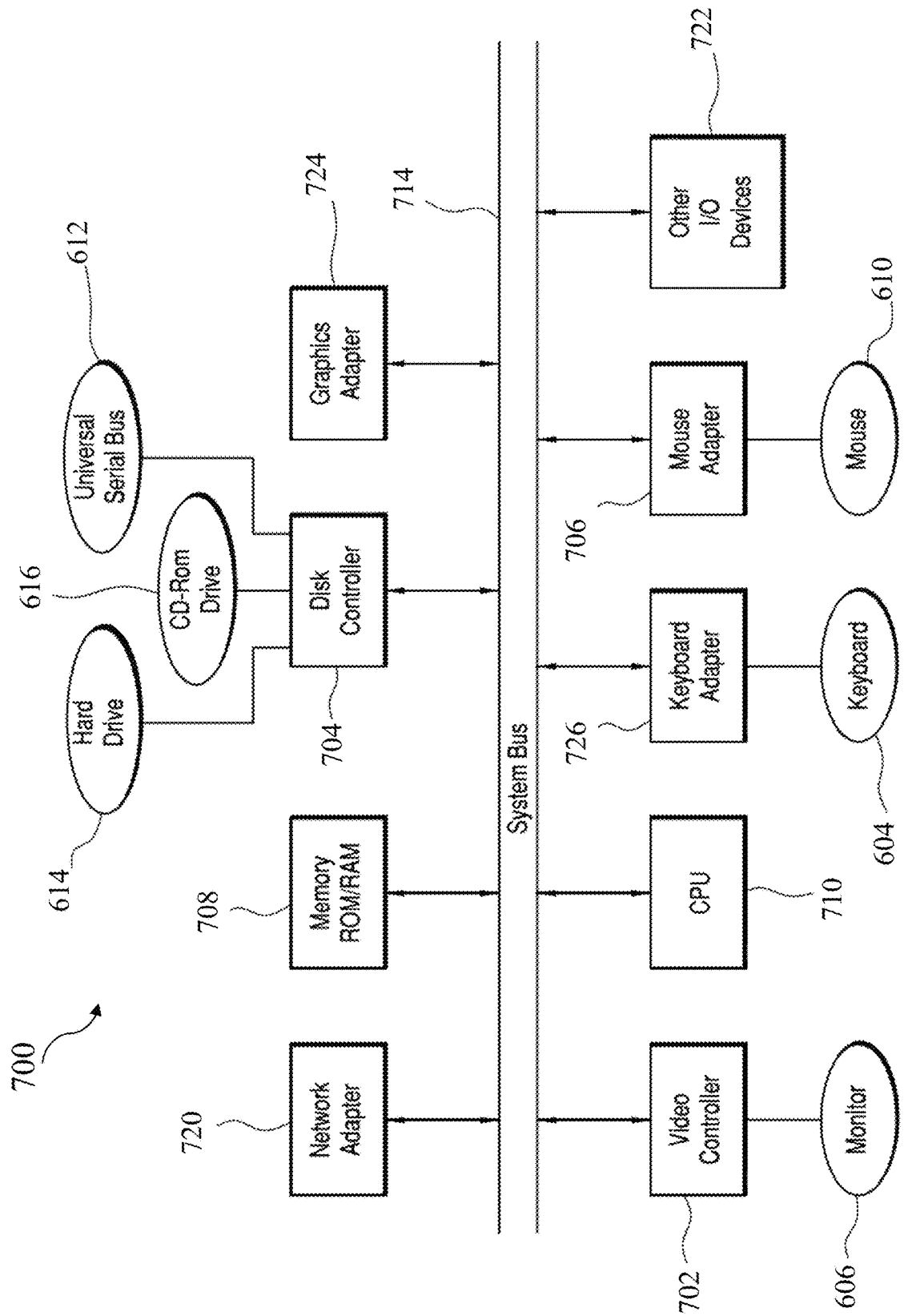
FIG. 7 illustrates a representative block diagram of an example of elements included in circuit boards inside a chassis of the computer of FIG. 6.

Turning ahead in the drawings, FIG. 6 illustrates a computer 600, all of which or a portion of which can be suitable for implementing an embodiment of at least a portion of system 110 (FIG. 1), sender financial institution system 120 (FIG. 1), recipient financial institution system 130 (FIG. 1), donor device 152 (FIG. 1), donee device 154 (FIG. 1), DONOR DEVICE (FIG. 1), FINANCIAL INSTITUTION SYSTEM (FIG. 3), SYSTEM (FIG. 3), TAX AUTHORITY SYSTEM (FIG. 3), RECIPIENT FINANCIAL INSTITUTION SYSTEM (FIG. 3), DONEE DEVICE (FIG. 3), FUNDRAISER DEVICE (FIG. 3), MONEY TRANSFER NETWORK SYSTEM (FIG. 3), and/or the techniques described in method 200 (FIG. 2), method 300 (FIG. 3), method 400 (FIG. 4), and/or method 500 (FIG. 5). Computer 6400 includes a chassis 602 containing one or more circuit boards (not shown), a USB (universal serial bus) port 612, a Compact Disc Read-Only Memory (CD-ROM) and/or Digital Video Disc (DVD) drive 416, and a hard drive 614. A representative block diagram of the elements included on the circuit boards inside chassis 602 is shown in FIG. 7. A central processing unit (CPU) 710 in FIG. 7 is coupled to a system bus 714 in FIG. 7. In various embodiments, the architecture of CPU 710 can be compliant with any of a variety of commercially distributed architecture families.

Continuing with FIG. 7, system bus 714 also is coupled to memory 708 that includes both read only memory (ROM) and random access memory (RAM). Non-volatile portions of memory storage unit 708 or the ROM can be encoded with a boot code sequence suitable for restoring computer 600 (FIG. 6) to a functional state after a system reset. In addition, memory 708 can include microcode such as a Basic Input-Output System (BIOS). In some examples, the one or more memory storage units of the various embodiments disclosed herein can comprise memory storage unit 708, a USB-equipped electronic device, such as an external memory storage unit (not shown) coupled to universal serial bus (USB) port 612 (FIGS. 6-7), hard drive 614 (FIGS. 6-7), and/or CD-ROM or DVD drive 616 (FIGS. 6-7). In the same or different examples, the one or more memory storage units of the various embodiments disclosed herein can comprise an operating system, which can be a software program that manages the hardware and software resources of a computer and/or a computer network. The operating system can perform basic tasks such as, for example, controlling and allocating memory, prioritizing the processing of instructions, controlling input and output devices, facilitating networking, and managing files. Some examples of common operating systems can comprise Microsoft® Windows® operating system (OS), Mac® OS, UNIX® OS, and Linux® OS.

As used herein, "processor" and/or "processing module" means any type of computational circuit, such as but not limited to a microprocessor, a microcontroller, a controller, a complex instruction set computing (CISC) microprocessor, a reduced instruction set computing (RISC) microprocessor, a very long instruction word (VLIW) microprocessor, a graphics processor, a digital signal processor, or any other type of processor or processing circuit capable of performing the desired functions. In some examples, the one or more processors of the various embodiments disclosed herein can comprise CPU 710.

In the depicted embodiment of FIG. 7, various I/O devices such as a disk controller 704, a graphics adapter 724, a video controller 702, a keyboard adapter 726, a mouse adapter 706, a network adapter 720, and other I/O devices 722 can be coupled to system bus 714. Keyboard adapter 726 and mouse adapter 706 are coupled to a keyboard 604 (FIGS. 6 and 7) and a mouse 610 (FIGS. 6 and 7), respectively, of computer 700 (FIG. 7). While graphics adapter 724 and video controller 702 are indicated as distinct units in FIG. 7, video controller 702 can be integrated into graphics adapter 724, or vice versa in other embodiments. Video controller 702 is suitable for refreshing a monitor 606 (FIGS. 6 and 7) to display images on a screen 608 (FIG. 6) of computer 600 (FIG. 6). Disk controller 704 can control hard drive 614 (FIGS. 6 and 7), USB port 612 (FIGS. 6 and 7), and CD-ROM or DVD drive 616 (FIGS. 6 and 7). In other embodiments, distinct units can be used to control each of these devices separately.

In some embodiments, network adapter 720 can comprise and/or be implemented as a WNIC (wireless network interface controller) card (not shown) plugged or coupled to an expansion port (not shown) in computer system 600 (FIG. 6). In other embodiments, the WNIC card can be a wireless network card built into computer system 600 (FIG. 6). A wireless network adapter can be built into computer system 600 (FIG. 6) by having wireless communication capabilities integrated into the motherboard chipset (not shown), or implemented via one or more dedicated wireless communication chips (not shown), connected through a PCI (peripheral component interconnector) or a PCI express bus of computer system 600 (FIG. 6) or USB port 612 (FIG. 6). In other embodiments, network adapter 720 can comprise and/or be implemented as a wired network interface controller card (not shown).

Although many other components of computer 600 (FIG. 6) are not shown, such components and their interconnection are well known to those of ordinary skill in the art. Accordingly, further details concerning the construction and composition of computer 600 and the circuit boards inside chassis 602 (FIG. 6) need not be discussed herein.

When computer 600 in FIG. 6 is running, program instructions stored on a USB drive in USB port 612, on a CD-ROM or DVD in CD-ROM and/or DVD drive 616, on hard drive 614, or in memory 708 (FIG. 7) are executed by CPU 710 (FIG. 7). A portion of the program instructions, stored on these devices, can be suitable for carrying out all or at least part of the techniques described herein. In various embodiments, computer 700 can be reprogrammed with one or more modules, applications, and/or databases to convert a general purpose computer to a special purpose computer.

Although computer system 600 is illustrated as a desktop computer in FIG. 6, there can be examples where computer system 600 may take a different form factor while still having functional elements similar to those described for computer system 600. In some embodiments, computer system 600 may comprise a single computer, a single server, or a cluster or collection of computers or servers, or a cloud of computers or servers. Typically, a cluster or collection of servers can be used when the demand on computer system 400 exceeds the reasonable capability of a single server or computer. In certain embodiments, computer system 600 may comprise a portable computer, such as a laptop computer. In certain other embodiments, computer system 600 may comprise a mobile device, such as a smartphone. For example, donor device 152 (FIG. 1) can be a mobile device, such as a smartphone. In certain additional embodiments, computer system 600 may comprise an embedded system.

Although systems and/or methods for processing real-time donations have been described with reference to specific embodiments, it will be understood by those skilled in the art that various changes may be made without departing from the spirit or scope of the disclosure. Accordingly, the disclosure of embodiments is intended to be illustrative of the scope of the disclosure and is not intended to be limiting. It is intended that the scope of the disclosure shall be limited only to the extent required by the appended claims. For example, to one of ordinary skill in the art, it will be readily apparent that any element of FIGS. 1-7 may be modified, and that the foregoing discussion of certain of these embodiments does not necessarily represent a complete description of all possible embodiments. For example, one or more of the procedures, processes, or activities of FIGS. 2-5 may include different procedures, processes, and/or activities and be performed by many different modules, in many different orders, and/or one or more of the procedures, processes, or activities of FIGS. 2-5 may include one or more of the procedures, processes, or activities of another different one of FIGS. 2-5.

Replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefits, advantages, solutions, or elements are stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A system comprising:
one or more processors; and
one or more non-transitory computer-readable media storing computing instructions that, when run on the one or more processors, cause the one or more processors to perform:
  receiving, in real-time and through a computer network, a donation authorization from a donor via a donor user interface executed on a donor device, wherein:
    the donation authorization comprises a donation amount, a donor token for the donor, and a donee first token for a donee;
    the donor token is uniquely associated with a donor account for the donor and maintained by a sender financial institution; and
    the donee first token is uniquely associated with a donee account for the donee and maintained by a receiver financial institution;
  after receiving the donation authorization, facilitating, in real-time and through the computer network, the receiver financial institution to post in real-time the donation amount to the donee account; and
  after receiving the donation authorization, facilitating, through the computer network, the sender financial institution to settle the donation amount with the receiver financial institution, wherein:
    a settlement time of when the sender financial institution settles the donation amount with the receiver financial institution is independent from a posting time of when the receiver financial institution posts the donation amount to the donee account.

2. The system in claim 1, wherein:
the donation authorization further comprises donee information;
the donee first token is associated with a first indication or a second indication; and
when the donee first token is associated with the first indication, the donee information is uniquely associated with the donee first token.

3. The system in claim 2, wherein:
the donor user interface is configured to be executed on the donor device and perform:
  receiving a donee first token input associated with the donee first token;
  after receiving the donee first token input, when the donee first token is associated with the second indication, prompting the donor to provide a donee second token input associated with a donee second token for the donee;
  receiving a donation amount input associated with the donation amount; and
  incorporating the donee first token input, the donee second token input, and the donation amount input into the donation authorization.

4. The system in claim 1, wherein:
the donation authorization further comprises donee information; and
the donee information comprises donation campaign information for the donee and is configured to identify at least one of:
  a fundraiser; or
  a fundraising campaign.

5. The system in claim 1, wherein:
the donation authorization further comprises donee information; and
the donee information comprises a tax exempt status.

6. The system in claim 5, wherein:
at least a portion of the donee information is provided, through the computer network, via a donee user interface executed on a donee device of the donee; and
the computing instructions, when run on the one or more processors, further cause the one or more processors to perform:
  after receiving the donee information, facilitating, in real-time and through the computer network, a charity vetting server to authenticate the tax exempt status from a tax authority.

7. The system in claim 5, wherein the computing instructions, when run on the one or more processors, further cause the one or more processors to perform:
prior to facilitating the receiver financial institution to post in real-time the donation amount to the donee account, providing, in real-time and through the computer network, a notice associated with the tax exempt status to be displayed on the donor user interface to the donor; and
after providing the notice associated with the tax exempt status, receiving, in real-time and through the computer network via the donor user interface, a confirmation from the donor to pay the donation amount as a tax exempt donation.

8. The system in claim 1, wherein:
the donation authorization further comprises donee information; and
the computing instructions, when run on the one or more processors, further cause the one or more processors to perform:
  after facilitating the receiver financial institution to post in real-time the donation amount to the donee account, providing, in real-time and through the computer network, a donation confirmation to be displayed on at least one of:
    a donee user interface associated with donee contact information of the donee first token; or
    a fundraiser user interface associated with fundraiser contact information of the donee information.

9. The system in claim 1, wherein:
the computing instructions, when run on the one or more processors, further cause the one or more processors to perform:
after facilitating the receiver financial institution to post in real-time the donation amount to the donee account, providing, in real-time and through the computer network, a receipt of the donation amount to be displayed on the donor user interface to the donor.

10. The system in claim 9, wherein:
the donation authorization further comprises donee information; and
the receipt comprises information associated with at least one of:
a donation tax exempt status determined based on the donee information;
a donee-specific history of donations made by the donor to the donee;
a fundraiser-specific history of donations made by the donor to a fundraiser of the donee; or
a campaign-specific history of donations made by the donor to a fundraising campaign of the donee.

11. A method being implemented via execution of computing instructions configured to run at one or more processors and stored at one or more non-transitory computer-readable media, the method comprising:
receiving, in real-time and through a computer network, a donation authorization from a donor via a donor user interface executed on a donor device, wherein:
the donation authorization comprises a donation amount, a donor token for the donor, and a donee first token for a donee;
the donor token is uniquely associated with a donor account for the donor and maintained by a sender financial institution; and
the donee first token is uniquely associated with a donee account for the donee and maintained by a receiver financial institution;
after receiving the donation authorization, facilitating, in real-time and through the computer network, the receiver financial institution to post in real-time the donation amount to the donee account; and
after receiving the donation authorization, facilitating, through the computer network, the sender financial institution to settle the donation amount with the receiver financial institution, wherein:
a settlement time of when the sender financial institution settles the donation amount with the receiver financial institution is independent from a posting time of when the receiver financial institution posts the donation amount to the donee account.

12. The method in claim 11, wherein:
the donation authorization further comprises donee information; and
the donee first token is associated with a first indication or a second indication; and
when the donee first token is associated with the first indication, the donee information is uniquely associated with the donee first token.

13. The method in claim 12, wherein:
the donor user interface is configured to be executed on the donor device and perform:
receiving a donee first token input associated with the donee first token;
after receiving the donee first token input, when the donee first token is associated with the second indication, prompting the donor to provide a donee second token input associated with a donee second token for the donee;
receiving a donation amount input associated with the donation amount; and
incorporating the donee first token input, the donee second token input, and the donation amount input into the donation authorization.

14. The method in claim 11, wherein:
the donation authorization further comprises donee information; and
the donee information comprises donation campaign information for the donee and is configured to identify at least one of:
a fundraiser; or
a fundraising campaign.

15. The method in claim 11, wherein:
the donation authorization further comprises donee information; and
the donee information comprises a tax exempt status.

16. The method in claim 15, wherein:
at least a portion of the donee information is provided, through the computer network, via a donee user interface executed on a donee device of the donee; and
the method further comprises:
after receiving the donee information, facilitating, in real-time and through the computer network, a charity vetting server to authenticate the tax exempt status from a tax authority.

17. The method in claim 15 further comprising:
prior to facilitating the receiver financial institution to post in real-time the donation amount to the donee account, providing, in real-time and through the computer network, a notice associated with the tax exempt status to be displayed on the donor user interface to the donor; and
after providing the notice associated with the tax exempt status, receiving, in real-time and through the computer network via the donor user interface, a confirmation from the donor to pay the donation amount as a tax exempt donation.

18. The method in claim 11, wherein:
the donation authorization further comprises donee information; and
the method further comprises:
after facilitating the receiver financial institution to post in real-time the donation amount to the donee account, providing, in real-time and through the computer network, a donation confirmation to be displayed on at least one of:
a donee user interface associated with donee contact information of the donee first token; or
a fundraiser user interface associated with fundraiser contact information of the donee information.

19. The method in claim 11 further comprising:
after facilitating the receiver financial institution to post in real-time the donation amount to the donee account, providing, in real-time and through the computer network, a receipt of the donation amount to be displayed on the donor user interface to the donor.

20. The method in claim 19, wherein:
the donation authorization further comprises donee information; and
the receipt comprises information associated with at least one of:
a donation tax exempt status determined based on the donee information;

a donee-specific history of donations made by the donor to the donee;
a fundraiser-specific history of donations made by the donor to a fundraiser of the donee; or
a campaign-specific history of donations made by the donor to a fundraising campaign of the donee.

* * * * *